Jan. 25, 1938. R. E. HILLIER 2,106,638
VALVE STEM
Filed April 30, 1932
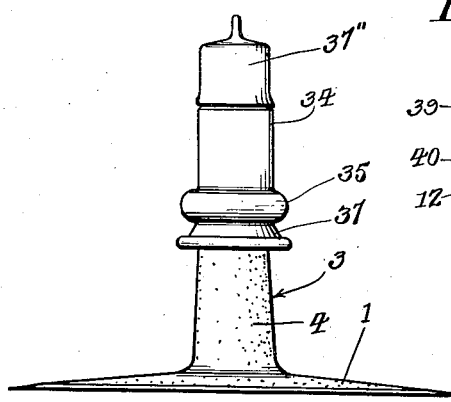
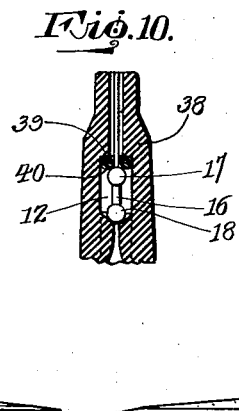
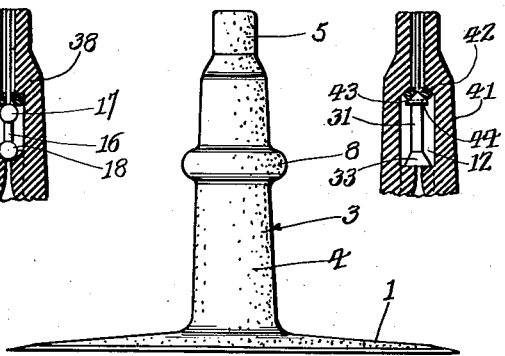
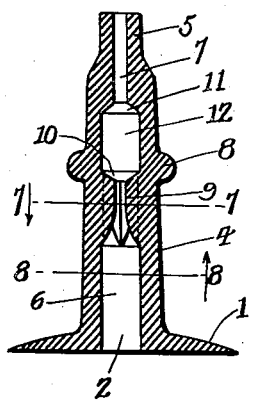
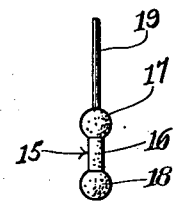
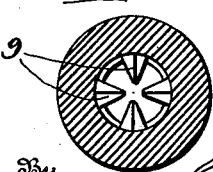
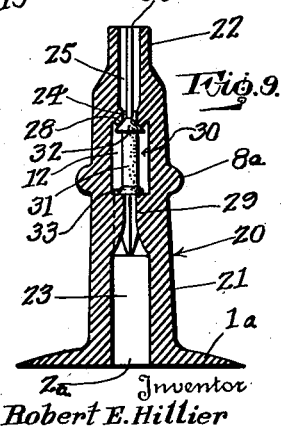
Inventor
Robert E. Hillier
By Geo. P. Kimmel
Attorney Patented Jan. 25, 1938

2,106,638

UNITED STATES PATENT OFFICE 2,106,638

VALVE STEM

Robert E. Hillier, Akron, Ohio, assignor to The F. H. Watson Company, Jonesboro, Ark., a corporation of Delaware Application April 30, 1932, Serial No. 608,503

12 Claims. (Cl. 152—12)

This invention relates to a resilient tire valve stem of rubber or like material designed primarily for use in connection with tires of the low pressure drop center rim type, but it is to be understood that a valve stem, in accordance with this invention is for use in any connection for which it is found applicable, and the invention has for its object to provide, in a manner as hereinafter set forth, a valve stem structure including a tubular, non-metallic resilient body or housing element having arranged therein a resiliently seated valve element and with such elements, when the valve stem structure is employed, overcoming the objection to be referred to, which is present in the metallic type of valve stem when a tire becomes deflated.

It is well known, that with a drop center rim type tire, when a tire goes flat with the vehicle in motion, it almost invariably tears the valve stem from or out of the inner tube, or damages the latter to an extent necessitating the substitution of a new tube therefor or requiring repairment to place the damaged tube in condition for use, and such objections are eliminated by a valve stem structure in accordance with this invention.

Further objects of the invention are to provide, in a manner as hereinafter set forth, a resilient valve stem structure which is simple in its construction, strong, compact, practical, thoroughly efficient in use, reducing impairment thereto to a minimum on the flattening of the tire while the vehicle is in motion, and comparatively inexpensive to manufacture.

To the above ends, and to others which may hereinafter appear, the invention consists of such parts, and such combination of parts which fall within the scope of the invention as claimed.

In the drawing:

Figure 1 is an elevation of a valve stem structure in accordance with this invention with a protective sleeve and a closure cap thereof in set position.

Figure 2 is a view similar to Figure 1 with the sleeve and cap removed.

Figure 3 is a vertical sectional view of the stem as shown in Figure 1.

Figure 4 is a top plan view of the stem as shown in Figure 2.

Figure 5 is a vertical sectional view of the valve stem structure with the cap, sleeve and valve element removed.

Figure 6 is an elevation of the valve element.

Figures 7 and 8 are respectively sections on lines 7—7 and 8—8 of Figure 5.

Figure 9 is a vertical sectional view of a modified form of valve stem structure, in accordance with this invention, with the sleeve and cap removed.

Figures 10 and 11 are fragmentary views in vertical section of other modified forms.

The valve stem structure shown in Figures 1 to 8 comprises an elongated tubular stem body 3 of yielding or resilient material such as rubber formed with large and reduced portions 4, 5 respectively, the former being of greater length than the latter. The portion 5 is at the tip end of the stem and at the base of portion 4 is an integral attachment flange or flap 1. For convenience of description the tip of the flexible stem body will be considered to be the upper end and the flap 1 to be at the lower end.

The flap is pierced by a bore portion 2 which is continued at 6 into the body portion 4, the latter being surmounted by a constricted bore portion 7, a through air passage being thus provided. At the juncture of the bore portions 6 and 7 is formed an integral shoulder 11 of the body material faced toward the base of the stem, this shoulder being disposed at such an angle with respect to the wall portions of the bore as to provide an upwardly tapered or conical shoulder surface which constitutes a resilient or yieldable valve seat.

Below the shoulder 11 the bore 6 is partially obstructed by a longitudinally extending series of inwardly extending splines or ribs 9 whose form and arrangement may be most clearly seen in Figures 7 and 8. As shown in these figures, the splines are V-shaped in cross section and each has its upper end bevelled as at 10. They do not unduly impair the capacity of the bore. The upper ends of the splines 9 in conjunction with the shoulder 11 and the portion of the bore therebetween define a valve chamber 12.

The stem body, as here shown, is provided intermediate its ends with an external peripheral rib or bead 8. When the flange 1 is secured to the inner face of the tube, not shown, the tubular body 3 extends outwardly through an opening in the latter and is arranged in a known manner.

Arranged within the chamber 12 is a compressible, resilient valve 15 of soft rubber. The valve consists of a shank 16 provided at one end with a globular valve element or body 17 which coacts with the seat 11 for closing the air intake passage. The other end of shank 16 is formed with a globular support 18 which seats upon the abutment provided by the outer ends of the splines 9. Normally valve 15 will be in the position as shown in Figure 3, and with element 17 acting to prevent intake or discharge of air. The valve stem structure normally is in closed position and to open it for air intake to the tube, not shown, the valve 15 is compressed for the purpose of shifting body 17 off its seat. The means, as shown, for compressing valve 15 to provide for air intake consists of a shiftable pin 19 arranged within and of less diameter than the bore 7. The pin 19 can be formed of any suitable material and has its inner end anchored in the top of body 17. The length of pin 19 is such that when body 17 is against its seat, the outer end of the former will not project beyond the outer end of portion 5 of the tubular body 3. The pin 19 is manually shifted inwardly by the application of pressure to the outer end thereof by any suitable means. The outward shift of the pin is caused by the expansion of valve 15 when the outer end of pin 19 is relieved of pressure.

The stem of Figure 9 is generally the same as that of Figures 1 to 8, comprising a tubular body 20, provided with the external rib 8a, and the flap 1a. The body 20 comprises the main portion 21 and the reduced tip portion 22, the portion 21 being integrally formed with the flap 1a. A through air passage includes bore portions 2a, 23, 24 and 25. The bore portion 25 is of smaller diameter than the portion 23, portion 24 being a restricted zone between the two and providing a downwardly faced conical shoulder 28 which constitutes a valve seat. The splines 29 are the same as before except that they have flat or squared upper ends. The compressible valve 30 shown in Figure 9 is of the same form as the valve 15, with this exception, the shank 31 of valve 30 has a conoidal shaped valve element or body 32 at one end and a frusto-conical support 33 at its other end. The valve 30 is for the same purpose and functions in the same manner as valve 15. A pin 33 for the same purpose as pin 19 is anchored at its inner end in the apex of element 32. Otherwise than that as stated, the form shown in Figure 9 is the same as that shown in Figures 3 to 7.

The valves 15 and 30 are inserted into the valve chamber 12 from the inner ends of the housings 3 and 20 respectively.

The tubular body and flange are a unit and constructed of the same material.

Tightly encompassing the tubular body 3 for the major portion of the length of the latter, is a metallic stiffening member 34 therefor of sleeve like form. The member 34 for the major portion of its length conforms in contour to that of tubular body 3 and is of a length to extend from the upper end of the latter to a point below bead 8. The member 34 is provided in proximity to its inner end with an annular hollow offset part 35 providing a groove 36 into which the bead 8 extends. That portion 37 of the member 34 inwardly of the offset part 35 flares outwardly from the latter and is spaced from tubular body 3. The outer portion 37' of member 34 is inset and peripherally threaded. The member 34 not only frictionally engages tubular body 3, but is latched therewith by the coaction of bead 8 and part 35. The member 34 is arranged with respect to the tubular body 3 to prevent the lateral expansion of that portion of the latter which provides the valve chamber and to permit of a limited lateral expansion of that portion of the body 3 inwardly adjacent to the outer ends of the splines 9. A removable closure cap 37" is provided for the outer end of the housing 3. The cap 37" is internally threaded for engagement with the threads of portion 37' of member 34.

The sleeve 34 may be conceived of as a ferrule secured externally of the casing and terminating in the zone of the internal restriction or shoulder 11. It constitutes a relatively rigid band in at least substantially surrounding relation to the shoulder for the purpose of resisting distention thereof by the valve element 17 which is normally held thereagainst. A portion of the band or sleeve, namely the lower portion of the hollow off-set part 35, underlies the portion 8 of the body with anchoring effect. That portion of the valve stem body below the sleeve 34 remains freely flexing and, as here shown, is a substantial part of the stem body length.

Referring to Figure 10, the tubular body 38 is formed with an internal annular flat shoulder 39 against which is positioned a resilient annulus 40 having its body of circular cross section. The annulus 40 provides a valve seat for the head of the valve 17. Otherwise than that as stated, the form shown in Figure 10 will be the same as that shown in Figure 3.

With reference to Figure 11, the tubular body 41 is formed with an internal annular beveled shoulder 42 against which is positioned a resilient annulus 43 having its body of polygonal cross section. The annulus provides a seat for the conoidal shaped head of the valve 44. The housing 41 is not formed with a shoulder above shoulder 42 of a reduced inner diameter part 24 as shown in Figure 9. Otherwise than that as stated the form shown in Figure 11 will be the same as that shown by Figure 9.

The stiffening member 34 and cap 37" will be employed in connection with tubular bodies 20, 38 and 41 in the same manner as referred to relative to housing 3.

What I claim is:

1. In a tire valve, the combination with a non-metallic resilient tubular body having the bore thereof formed intermediate its ends with a valve seat and a partly obstructing means spaced from and interposed between said seat and its inner end, that portion of the bore between and in connection with said seat and means providing a valve chamber, and a controlling valve within said chamber, of means mounted on said body for preventing the lateral expansion thereof between said seat and obstructing means and for limiting lateral expansion of said body at points adjacent to said obstructing means.

2. A tire valve comprising a tubular non-metallic soft resilient body having a part of the wall of its bore at a point adjacent to and spaced from one end thereof disposed at an angle with respect to the wall portions of the bore adjacent thereto to provide a soft resilient valve seat, said wall having spaced parts disposed adjacent to and spaced inwardly from said valve seat, said spaced parts extending radially toward and terminating adjacent the axis of the bore and constituting a resilient abutment means, and a non-metallic valve member of soft resilient material throughout normally abutting said seat and permanently abutting said spaced parts.

3. A tire valve comprising a body of soft resilient rubber-like material having a bore therethrough, said body being formed intermediate its ends with a soft resilient valve seat and with a soft resilient abutment spaced axially from said valve seat, and a valve member of soft elastic rubber-like material throughout having a part adapted to bear against said abutment, and another part adapted to be resiliently urged by the elasticity of the valve member itself to seat against said valve seat to close the same and being capable of distortion against its own elasticity to unseat said second mentioned part from the valve seat to open the valve.

4. A tire valve stem, the body of which is formed of a yielding resilient material having a lengthwise bore therethrough, said body being formed internally with a similarly yielding resilient valve seat presented inwardly around said bore, and with integral means also within the bore forming an outwardly presented abutment spaced axially inwardly of said valve seat, and a valve member of yielding resilient material having heads at its opposite ends, one of said heads contacting the said abutment and the other head engaging the said valve seat, and normally so held by the natural resilience of the valve member, said valve member having a connecting portion between said heads which is readily distortable against its own elasticity to permit unseating of said valve head from said valve seat, without unseating the abutment contacting head thereof.

5. In a valve assembly, a tubular valve casing of flexible material having an internal restriction constituting a valve seat, a ferrule secured externally of said casing and terminating in the zone of said restriction to serve as a reenforcement therefor, a cooperating valve member movable in said casing for engaging said restriction, a valve pin for said valve member extending into said casing past the restriction to operate the valve.

6. In a pneumatic tire valve and stem, a stem member adapted to be connected with a pneumatic tube including a bore therethrough and a chamber formed intermediate the ends of said bore whereby a shoulder is provided at the upper end of the chamber, the walls of said chamber and bore being yieldable, a body element axially shiftable relative to said stem including a valve head of greater diameter than said bore and less in diameter than said chamber, said valve head adapted to seal said stem member when forced against said shoulder and to permit flow of air through said valve stem when moved away from said shoulder, and a restraining member surrounding said stem member and extending in both directions longitudinally of said stem member beyond the sealing position of said valve head.

7. In a valve assembly, a tubular valve casing of flexible material having an internal restriction constituting a valve seat, a ferrule secured externally of said casing and terminating in the zone of said restriction to serve as a reenforcement therefor, a cooperating valve member movable in said casing for engaging said restriction, a valve pin for said valve member extending into said casing past the restriction to operate the valve, and a closure cap securable to said ferrule.

8. A valve stem comprising a rubber body portion provided with a through passage constricted near the tip of the stem to provide a downwardly faced shoulder, a valve element normally seated against said shoulder to close said passage, and a relatively rigid band substantially surrounding said shoulder to resist distention thereof.

9. A valve stem comprising a rubber body portion provided with a longitudinal passage extending from base to tip, said passage being formed with a constriction adjacent its tip end whereby a shoulder of the body material faced toward the base of the stem is provided, a valve element normally held seated against said shoulder, and a relatively rigid band surrounding said shoulder in such manner as to resist distention of the latter by the valve element.

10. A valve stem comprising a rubber body portion provided with a longitudinal passage extending from base to tip, said passage being formed with a constriction whereby a conical shoulder of the body material faced toward the base of the stem is provided, a valve element normally held seated against said shoulder to close said passage, and a reinforcing element extending from a point above said shoulder to a point at least below the upper end of said shoulder so as to surround at least a portion of said shoulder whereby to resist distention of said shoulder by said valve element, the arrangement being such that said rubber body portion is freely flexing at least throughout a substantial part of its length.

11. A valve stem comprising a rubber body portion provided with a longitudinal passage extending from base to tip, said passage being formed with a constriction whereby a conical annular shoulder of the body material faced toward the base of the stem is provided, a valve element normally held seated against said shoulder to close said passage, and a band surrounding at least a portion of said shoulder to resist distention of the latter by said valve element, at least a portion of said band underlying a portion of said body portion with anchoring effect.

12. A valve stem comprising a rubber body portion provided with a longitudinal passage extending from base to tip, said passage being formed with a constriction whereby a conical annular shoulder of the body material faced toward the base of the stem is provided, a valve element normally held seated against said shoulder to close said passage, and a band surrounding at least a portion of said shoulder to resist distention of the latter by said valve element, at least a portion of said band underlying a portion of said body portion with anchoring effect, the stem other than the part affected by said band being freely flexing.

ROBERT E. HILLIER.